April 8, 1947. G. DEAKIN ET AL Re. 22,861

ELECTRIC SELECTION CONTROLLING CIRCUIT

Original Filed May 6, 1943 2 Sheets-Sheet 1

INVENTORS.
GERALD DEAKIN
HENRY F. HERBIG

BY E. D. Phinney
ATTORNEY

April 8, 1947. G. DEAKIN ET AL Re. 22,861

ELECTRIC SELECTION CONTROLLING CIRCUIT

Original Filed May 6, 1943 2 Sheets-Sheet 2

INVENTORS.
GERALD DEAKIN
HENRY F. HERBIG
BY E. D. Phinney
ATTORNEY

Reissued Apr. 8, 1947

Re. 22,861

UNITED STATES PATENT OFFICE 22,861

ELECTRIC SELECTION CONTROLLING CIRCUIT

Gerald Deakin, New York, N. Y., and Henry F. Herbig, Madison, N. J., assignors to International Standard Electric Corporation, New York, N. Y., a corporation of Delaware Original No. 2,354,668, dated August 1, 1944, Serial No. 485,830, May 6, 1943. Application for reissue April 23, 1945, Serial No. 589,820

21 Claims. (Cl. 179—18)

Figure 1:
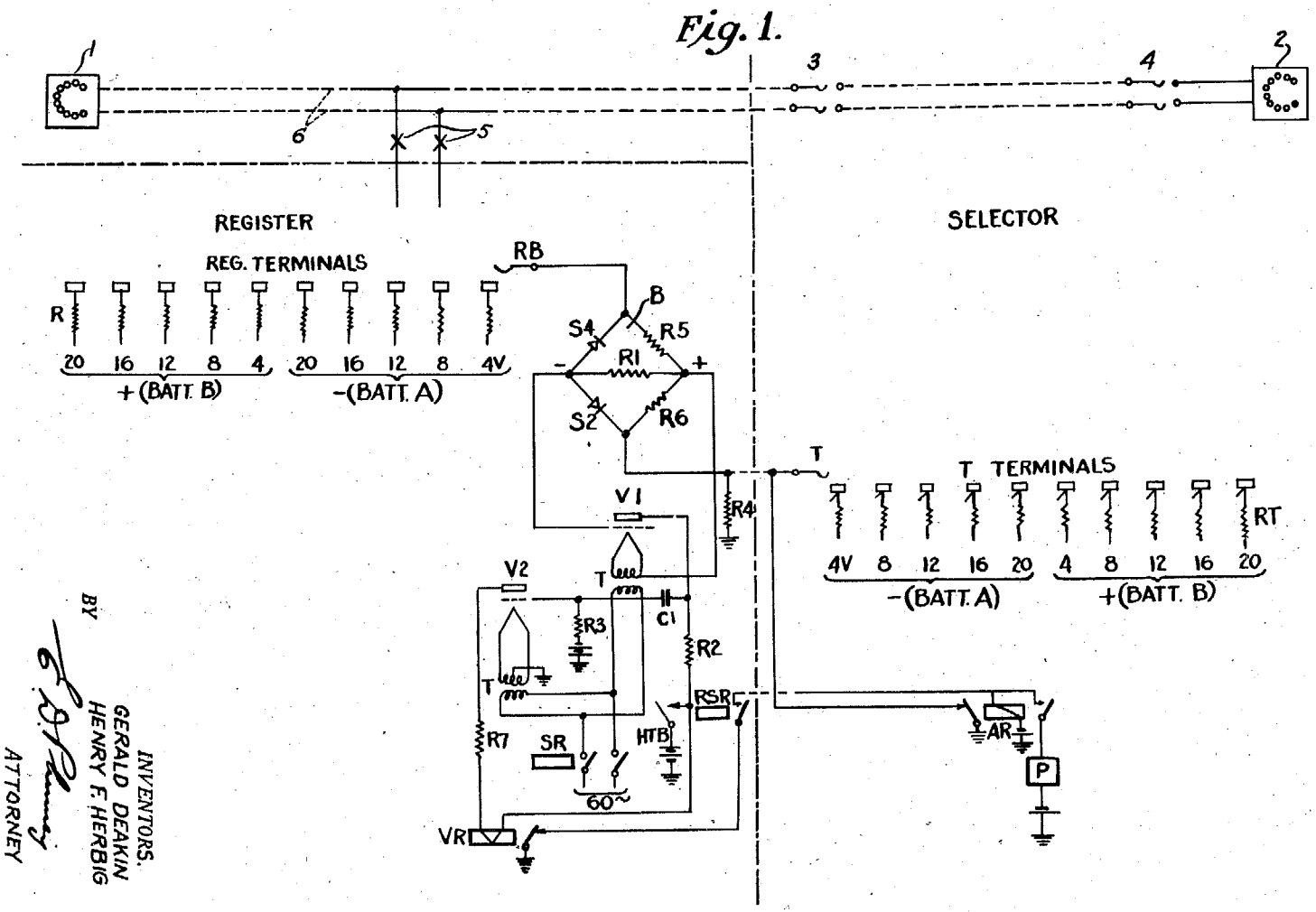

This invention relates to new and useful improvements in selection controlling circuits and more particularly to circuits for controlling the numerical selecting operation of selector switches employed in automatic telephone exchange systems.

The present invention is an improvement on the control circuits disclosed in the co-pending application of Gerald Deakin, Serial No. 484,184, filed April 23, 1943, now Patent No. 2,380,950, dated August 7, 1945, and the various applications and patents referred to therein.

The invention will be explained with reference to Figs. 1 and 2 of the drawings which diagrammatically illustrate two modifications of as much of a control system as is necessary for a clear understanding of the various features of the present invention.

In an automatic telephone system calling and called subscribers' stations 1 and 2 (Fig. 1) may be interconnected by means including a plurality of selector switches such as 3 and 4. The numerical operations of the selectors are controlled by the calling subscriber's customary impulse sender or other number indicating device through the agency of a register provided at the central exchange. The calling station 1 is connected to the brushes of selector 3 by non-numerical switches (not shown) and a connecting circuit 6, and the register is attached to the connecting circuit 6 through switching means 5.

The selector switches are of the customary type having a bank of terminals with which a set of brushes cooperates. In the drawings three brushes are shown for selector 3, although it may have a larger number of brushes. The selector brushes are moved over the terminals while a magnet P is energized and are stopped on a set of terminals when this magnet becomes de-energized.

The register comprises a series of switches successively operable by the calling device in accordance with the successive digits of the called number which are dialed by the calling subscriber. A brush and a set of terminals of one of these register switches is shown in Fig. 1. This is the register switch which responds to the digit destined for selector 3. When brush RB is advanced towards one of its ten terminals in accordance with the operation of the calling device at station 1, the register starting relay RSR having been energized in the customary manner, a circuit is closed from ground over the armature and back contact of a register relay VR, the right-hand armature and front contact of RSR and the winding of selector relay AR to grounded battery. The relay AR becomes energized, removes the ground from the test brush T of the selector 3 and closes an energizing circuit for the power magnet P in parallel with its winding. The selector will start hunting for a terminal which has the same potential applied to it as that applied to the terminal on which the register brush RB is resting.

Before the relay AR becomes energized the ground at the armature was connected over resistances R6 and R5 in a network B of the Wheatstone bridge type which is provided in the register, and in multiple through the resistance R1 and rectifier S4, to brush RB and thence to negative battery and ground. This makes the left corner of the bridge B negative with respect to the right corner and consequently the grid of a tube V1 negative with respect to the cathode of this tube which is connected to the right corner of the bridge. This is the case when the brush RB is resting on one of the first five terminals which are connected to the negative pole of the battery. When the register brush is resting on the second group of five terminals of the register switch it will connect the positive pole of the battery through resistance R5, resistance R6, and in multiple through resistance R1 and rectifier S2, to ground over the back contact of relay AR. In this case also the left-hand corner of the bridge will be negative with respect to the right-hand corner.

As the brushes of selector 3 advance and the test brush T makes contact with the successive terminals, current flows from the register brush RB to the selector brush T or vice versa, depending upon the relative polarity of the register and selector terminals. However, the left-hand corner of bridge B and, therefore, the grid of V1 will always remain appreciably negative with respect to the right-hand corner of the bridge and cathode of V1 until the same potential is applied to both brushes.

When the relay RSR became energized, high tension battery HTB was connected over its left-hand armature and front contact and a resistance R2 to the anode of vacuum tube V1. Through a condenser C1 the high tension battery is connected with the grid of a second vacuum tube V2, but this grid is maintained negative by a battery connection over resistance R3.

When the brush T of the selector reaches a terminal having the same potential and polarity as the terminal on which RB is resting, then approximately the same potential will be applied to the cathode and the grid of tube V1. The characteristic of V1 is such that it triggers off and closes the anode circuit under these conditions. When this happens, then the potential on the condenser C1 will drop sufficiently to cause the grid of the second tube V2 to become positive or nearly so, whereupon V2 also triggers off and operates the high speed relay VR. This relay opens the selector magnet circuit and the selector stops.

The anode circuit of tube V1 may be traced from the high tension battery HTB, the front contact of RSR, the resistance R2, the anode of V1, the cathode of V1, the positive corner of the rectifier bridge, resistances R5 and R6 in multiple and then over the brushes RB and T, respectively, to grounded positive or negative battery. A small amount of current passes through R1 and thence in multiple through rectifiers S2 and S4 to the two brushes RB and T. However, since R1 is shunted by R5 and R6, insufficient current will flow over this path to make the control grid of V1 sufficiently negative to stop emission in case high vacuum tubes are used. Preferably gas filled tubes are used in this circuit, because once such tubes are triggered into action the return of the grid to negative potential does not stop or even decrease emission and the relay VR is thus always assured of ample current for operation.

The resistors R1 to R6 are of fairly high resistance and not enough current will flow over the test wire during hunting to produce cross-talk.

When the high tension battery is connected over the front contact of relay RSR the bridge circuit must be kept continuously closed so that the left-hand corner of the bridge may be always negative with respect to the right-hand corner until the brushes RB and T have the same potential and polarity. This is accomplished on the selector side of the bridge by applying ground first over the back contact of the AR relay and then over the resistance R4. The path to the bridge will never be opened when the brush T passes from one terminal to the next. As explained in the above-mentioned application of Gerald Deakin, the selector brushes are usually set in motion before the register brush RB comes to rest. To guard against improper operation, the register brush is wide enough to bridge adjacent terminals and it must always be one or two steps ahead of the selector brush T. The selector hunts at six to ten times the speed of the register. Of course, in the selector bridging brushes are not permissible because the test terminals are multipled and a false test would occur if the brush made contact with one terminal while still in engagement with the receiving terminal. The grounding of the test wire over resistance R4 compensates for that.

The cathode of vacuum tube V1 must always be free from ground. This may be accomplished by using floating or indirectly heated cathodes or, as shown, by heating the filament cathodes of each tube over a small individual transformer T. The primary circuits of each tube transformer T are connected with a 60 cycle power supply over the front contacts of a relay SR which operates when the register is selected for connection with circuit 6. This will eliminate all delay in the heating up of the filament. The filaments may be heated from a D. C. source by inserting rectifiers in the secondary circuits of the individual transformers T or by providing individual batteries. Such method of heating filaments may be found expedient in small installations where A. C. power is not available.

It will be noted that when the selector and register brushes are resting on the highest negative potential, in the present case 20 volts, then the effective potential of the high tension HTB is augmented. On the other hand, when the brushes are resting on the highest positive potential, then the effective potential of HTB is decreased. Obviously, the potential of HTB must compensate for this drop.

Figure 2:
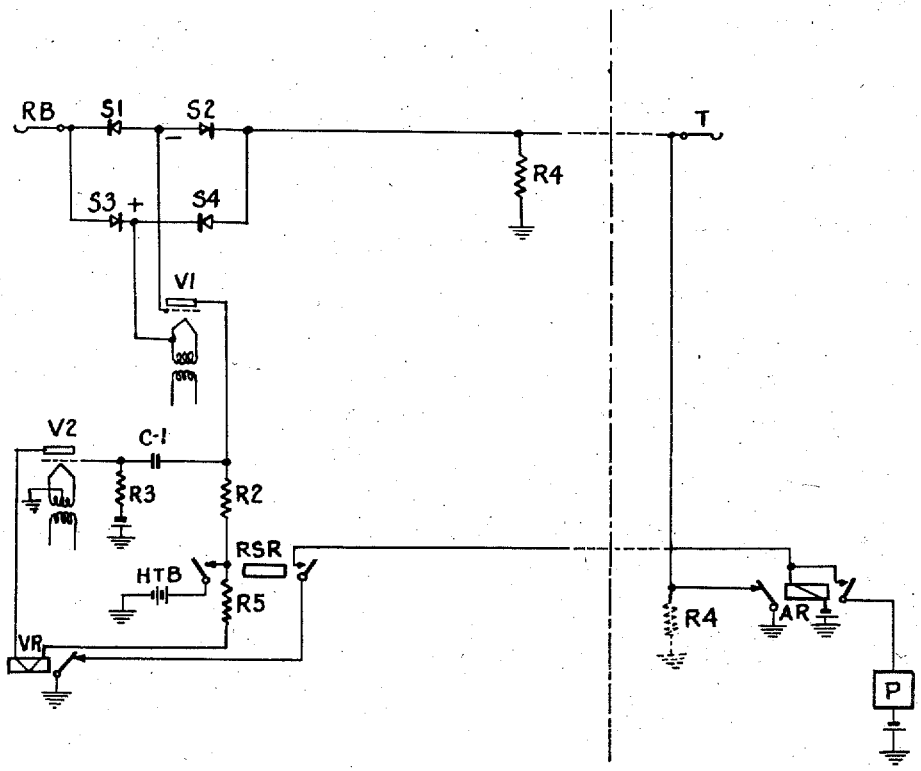

In the arrangement disclosed in Fig. 2, two pairs of rectifiers, S1, S2 and S3, S4 are used. Each pair is oppositely polarized and the rectifier pairs provide alternate parallel paths between the register brush RB and the selector brush T. The grid of a triode V1 is connected with one path between the two rectifiers and the cathode with the other path, also between the two rectifiers. The rectifiers are so poled that when any current flows from one brush to the other, the grid of tube V1 will be always negative and the cathode of this tube always positive. Only when the brushes RB and T have the same polarity and are at the same potential will the cathode and grid of tube V1 attain the same potential and cause the operation of the second vacuum tube V2. In all other respects the circuits of Figs. 1 and 2 are identical.

Since rectifiers have very high resistance to currents flowing in one direction, the only appreciable current that flows during hunting is through high resistance R4 to ground. This will guard against cross-talk. Should the flow of current over the test wire to R4 be found objectionable, this may be completely eliminated by connecting the resistance R4 to the brush T not at the register but at the selector. This is indicated in dotted lines.

While in Fig. 1 the terminals are shown as separated by four volt steps the circuit of Fig. 1 as well as Fig. 2 will operate on two volt steps or, of course, on larger steps than four volts.

If the rectifier S4 is shunted by a resistance then the tube V1 may be used to operate relay VR directly rather than through the agency of a second tube V2. Such arrangement might be objected to on the ground that appreciable current would flow over such shunting resistance when RB is positive with respect to brush T thus producing objectionable cross-talk.

Since the potential of the grid does not change with respect to the cathode when V1 emits full current, the two tubes V1 and V2 may be of the high vacuum type. However, gas filled triodes are preferred, certainly for tube V2.

What is claimed is:

1. In combination, a selector switch having a plurality of first contacts and a second cooperating contact, a magnet for controlling the contacting of the second with any of the first contacts, a register having a plurality of first contacts and a second contact, means for controlling the engagement between the first and second register contacts, a relay for said register having a contact for controlling the magnet, a vacuum tube in said register having a cathode, a grid and an anode, a source of potential, connections for applying the same potentials to the first contacts of the register and selector, there being a predetermined difference between the potentials applied to adjacent first contacts, an energizing circuit for said relay controlled by said vacuum tube, a circuit connecting the second contacts of the register and selector, and connections from the last-mentioned circuit to the grid and cathode of said tube.

2. In combination, a selector switch having a plurality of first contacts and a second cooperating contact, a magnet for controlling the contacting of the second with any of the first contacts, a register having a plurality of first contacts and a second contact, means for controlling the engagement between the first and second register contacts, a relay for said register having a contact for controlling the magnet, a vacuum tube in said register having a cathode, a grid and an anode, a source of potential, connections for applying the same potentials to the first contacts of the register and selector, there being a predetermined difference between the potentials applied to adjacent first contacts, an energizing circuit for said relay controlled by said vacuum tube, a circuit having alternate paths connecting the second contacts of the register and selector, means in said paths restricting current flow to a given direction, a connection from the grid to one path and a connection from the cathode to the other path.

3. In combination, a selector switch having a plurality of first contacts and a second cooperating contact, a magnet for controlling the contacting of the second with any of the first contacts, a register having a plurality of first contacts and a second contact, means for controlling the engagement between the first and second register contacts, a relay for said register having a contact for controlling the magnet, a vacuum tube in said register having a cathode, a grid and an anode, a source of D. C. potential, connections for applying the same positive potentials from said source to one group of the first contacts of the register and selector and the same negative potentials to a second group of said contacts, there being a predetermined voltage difference between the negative as well as the positive potentials applied to adjacent first contacts, an energizing circuit for said relay controlled over the anode of said vacuum tube, a circuit having alternate paths connecting the second contacts of the register and selector, a rectifier at least in one of said paths restricting current flow to a given direction, a connection from the grid to one path and a connection from the cathode to the other path.

4. In combination, a selector switch having a plurality of first contacts and a second cooperating contact, a magnet for controlling the contacting of the second with any of the first contacts, a register having a plurality of first contacts and a second contact, means for controlling the engagement between the first and second register contacts, a relay for said register having a contact for controlling the magnet, a first and a second vacuum tube in said register, each having a cathode, a grid and an anode, a source of potential, connections for applying the same potentials to the first contacts of the register and selector, there being a predetermined difference between the potentials applied to adjacent first contacts, an energizing circuit for said relay controlled over the anode of the second tube, a circuit connecting the second contacts of the register and selector, connections from the last-mentioned circuit to the grid and cathode of the first tube, and a connection from the anode of the first tube to the grid of the second tube.

5. In combination, a selector switch having a plurality of first contacts and a second cooperating contact, a magnet for controlling the contacting of the second with any of the first contacts, a register having a plurality of first contacts and a second contact, means for controlling the engagement between the first and second register contacts, a relay for said register having a contact for controlling the magnet, a vacuum tube in said register having a cathode, a grid and an anode, a source of D. C. potential, connections for applying the same potentials to the first contacts of the register and selector, negative to one group and positive to a second group, there being a predetermined voltage difference between the potentials applied to adjacent contacts, an energizing circuit for said relay controlled by said vacuum tube, a circuit connecting the second contacts of the register and selector, a Wheatstone bridge having its first and second corner connected in said circuit, and the third and fourth corner, respectively with the grid and cathode of said tube, resistances in two branches and rectifiers in the other two branches of said bridge.

6. In combination, a selector switch having a plurality of first contacts and a second cooperating contact, a magnet for controlling the contacting of the second with any of the first contacts, a register having a plurality of first contacts and a second contact, means for controlling the engagement between the first and second register contacts, a relay for said register having a contact for controlling the magnet, a vacuum tube in said register having a cathode, a grid and an anode, a source of D. C. potential, connections for applying the same potentials to the first contacts of the register and selector, negative to one group and positive to a second group, there being a predetermined voltage difference between the potentials applied to adjacent contacts, an energizing circuit for said relay controlled by said vacuum tube, a circuit having parallel paths connecting the second contacts of the register and selector, two oppositely poled rectifiers in each path, a connection from the grid to one path between the two rectifiers, and a connection from the cathode to the other path between the two rectifiers provided therein.

7. In combination, a selector switch having a plurality of terminals and a set of brushes cooperating therewith, a magnet for controlling operation of said brushes, a register comprising a switch having a plurality of terminals and a brush adapted successively to engage them, means for operating the register brush to engage any terminal, a relay for said register having a contact for controlling the magnet, two vacuum tubes in said register each having a cathode, a grid and an anode, a connection from the register brush to the selector brush including a first path in which current is allowed to flow in one direction only and a second path in which current is allowed to flow only in the opposite direction, a connection from the first path to the grid of the first tube, a connection from the second path to the cathode of the first tube, a source of potential, connections for applying the same potentials to the terminals of the register and of the selector, there being a predetermined difference between the potentials applied to adjacent terminals, an energizing circuit for said relay including the anode of the second tube, and a connection from the grid of the second tube to the anode of the first tube.

8. In combination, a selector switch having a plurality of terminals and a set of brushes cooperating therewith, a magnet for controlling operation of said brushes, a register comprising a switch having a plurality of terminals and a brush adapted successively to engage them, means for operating the register brush to engage any terminal, a relay for said register having a contact for controlling the magnet, two vacuum tubes in said register each having a cathode, a grid and an anode, a Wheatstone bridge having rectifiers in two branches and resistances in the other two branches, two opposite corners of said bridge being connected, respectively, with the register brush and the selector brush, and the other two, respectively, with the grid and cathode of the first tube, a source of D. C. potential, connections for applying the same potentials to the terminals of the register and of the selector, negative to one group and positive to a second group of said terminals, there being a predetermined voltage difference between the potentials applied to adjacent terminals, an energizing circuit for said relay including the anode of the second tube, and a connection from the grid of the second tube to the anode of the first tube.

9. In combination, a selector switch having a plurality of terminals and a set of brushes cooperating therewith, a magnet for controlling operation of said brushes, a register comprising a switch having a plurality of terminals and a brush adapted successively to engage them, means for operating the register brush to engage any terminal, a relay for said register having a contact for controlling the magnet, two vacuum tubes in said register each having a cathode, a grid and an anode, a connection from the register brush to the selector brush including two parallel paths, two oppositely poled rectifiers in series in each path, a connection from the grid of the first tube to the first path between the two rectifiers, a connection from the cathode of the first tube to the second path between the two rectifiers, a source of D. C. potential, connections for applying the same potentials to the terminals of the register and of the selector, negative to one group and positive to a second group of said terminals, there being a predetermined voltage difference between the potential applied to adjacent terminals, an energizing circuit for said relay including the anode of the second tube, and a connection from the grid of the second tube to the anode of the first tube.

10. In a switching system a selector switch having a plurality of contacts and a first contact wiper, control means for moving said wiper to successively establish contact between said wiper and said contacts, a plurality of sources of different steady direct current potential, means for maintaining on each said contact a predetermined steady direct current potential, a second contact wiper for contacting one of said plurality of contacts, means for selecting the one of said plurality of contacts that is contacted by said second contact wiper, potential comparing means having two terminals, means for connecting one of said last mentioned terminals to said first wiper and the other to said second wiper and for maintaining the same relative polarity between said terminals irrespective of whether the potential on said selected contact is greater or less than the potential of said first wiper, and means under the control of said comparing means for actuating said control means to arrest said first wiper when said potential on said selected contact and the potential derived over said first wiper are of the same polarity and substantially the same magnitude.

11. A switching system according to claim 10 in which said potential comparing means comprises an electron discharge tube and in which said means for connecting said potentials thereto comprises a rectifier bridge, connections from one pair of opposite diagonal points to two electrodes of said tube respectively, and connections from the other pair of opposite diagonal points to said first and second wipers.

12. In a switching system, a plurality of conductors, means for maintaining on each conductor a predetermined potential, a rectifier bridge circuit, potential comparing means including a high impedance path, means for connecting said high impedance path to said rectifier bridge circuit, a first connecting means for connecting a first conductor with a point on said bridge circuit, a second connecting means for connecting a second one of said conductors with another point on said bridge circuit, and means including said high impedance path and response to the connection with the bridge of two conductors whose potentials bear a predetermined relationship to one another for controlling said second connecting means.

13. The system according to claim 12, and in which said high impedance path comprises a discharge path within a multi-electrode electron discharge tube, two of whose electrodes are connected to diagonally opposite points of said bridge circuit.

14. The system according to claim 12, and in which said high impedance path comprises a discharge path within a multi-electrode electron discharge tube, two of whose electrodes are connected to diagonally opposite points of said bridge circuit and a third electrode is connected with the last-mentioned means for controlling said second connecting means.

15. The system according to claim 12, and in which said bridge circuit comprises a rectifier in each of its four branches.

16. The system according to claim 12, and in which said bridge circuit comprises a rectifier in each of two branches and an ohmic resistance in each of the other two branches.

17. The system according to claim 12, and in which said first connecting means is connected with one and said second connecting means with an opposite diagonal point of said bridge circuit.

18. In a switching system, a plurality of terminal contacts, a plurality of sources, a different steady direct current potential, means for maintaining on each contact a predetermined potential, potential comparing means comprising a single discharge path in a multi-electrode electron tube, a first connecting means connecting any one of said sources of potential with said comparing means, a second connecting means for connecting one of said contacts with said comparing means, and means including said electron discharge path and operative when two potentials applied to said comparing means bear a predetermined potential relationship to one another for controlling said second connecting means.

19. The system according to claim 18, and in which the two potentials applied to said comparing means are impressed upon two different electrodes of said tube.

20. The system according to claim 18, and in which said predetermined relationship between the potentials is that they are the same.

21. In a switching system, a plurality of conductors, means for maintaining on each said conductor a predetermined potential, potential comparing means including two terminals, a first connecting means for connecting a first one of said conductors with a first one of said terminals, a second connecting means for connecting a second one of said conductors with the other of said terminals, and means including said first and second connecting means and responsive to the predetermined relationship between the potentials on the conductors connected by said first and second connecting means to said potential comparing means for controlling said second connecting means.

GERALD DEAKIN.
HENRY F. HERBIG.